US012595163B2

(12) United States Patent
Hippel et al.

(10) Patent No.: US 12,595,163 B2
(45) Date of Patent: Apr. 7, 2026

(54) FREE-JET FILLING FOR A CONTAINER WITH A MULTI-COMPONENT FILLING PRODUCT

(71) Applicant: KRONES AG, Neutraubling (DE)

(72) Inventors: Andreas Hippel, Neutraubling (DE); Stefan Elsperger, Neutraubling (DE); Michael Neubauer, Neutraubling (DE)

(73) Assignee: KRONES AG, Neutraubling (DE)

( * ) Notice: Subject to any disclaimer, the term of this patent is extended or adjusted under 35 U.S.C. 154(b) by 16 days.

(21) Appl. No.: 18/535,118

(22) Filed: Dec. 11, 2023

(65) Prior Publication Data

US 2024/0190692 A1 Jun. 13, 2024

(30) Foreign Application Priority Data

Dec. 12, 2022 (DE) ..................... 10 2022 133 039.7

(51) Int. Cl.
*B67D 1/00* (2006.01)
*B67D 1/08* (2006.01)

(52) U.S. Cl.
CPC ......... *B67D 1/0021* (2013.01); *B67D 1/0894* (2013.01)

(58) Field of Classification Search
CPC .. B67D 1/0021; B67D 1/0894; B67D 1/0051; B67D 1/0052; B67C 3/026
See application file for complete search history.

(56) References Cited

U.S. PATENT DOCUMENTS

| | | | | | |
|---|---|---|---|---|---|
| 2,537,119 | A * | 1/1951 | Bauerlein | B67D 1/0052 | 239/416.4 |
| 5,791,385 | A * | 8/1998 | Stahlecker | B67C 3/24 | 141/270 |
| 6,345,729 | B1 * | 2/2002 | Santy, Jr. | B67D 1/0052 | 222/144.5 |

FOREIGN PATENT DOCUMENTS

| | | |
|---|---|---|
| DE | 102004042516 | 10/2006 |
| DE | 102020116266 | 12/2021 |
| DE | 102020124352 | 3/2022 |
| EP | 1632455 A1 | 3/2006 |
| EP | 2279149 | 7/2013 |
| WO | WO 94/02359 A1 | 2/1994 |
| WO | WO 2006/024409 A2 | 3/2006 |
| WO | 2013091750 | 6/2013 |

OTHER PUBLICATIONS

Search Report Issued on Oct. 23, 2023 by the German Patent Office in priority application No. DE 10 2022 133 039.7.
Extended European Search Report dated May 15, 2024 for EP Application No. 23215702.4, 7 pages.

* cited by examiner

*Primary Examiner* — Jason K Niesz
(74) *Attorney, Agent, or Firm* — Haynes and Boone, LLP

(57) ABSTRACT

Method and apparatus for the free-jet filling of a container with a filling product, for example a beverage. The apparatus includes several product components. The method includes holding the container by means of a container holder; and introducing the product components into the container so that the product components span a free-jet region in one jet in each instance. The product components span the free-jet region in separate jets, so that the product components mix only in the container. The container has a container wall and a container bottom, and is held obliquely by the container (Continued)

holder during filling, so that the product components impinge on the container wall after spanning the free-jet region.

15 Claims, 2 Drawing Sheets

FREE-JET FILLING FOR A CONTAINER WITH A MULTI-COMPONENT FILLING PRODUCT

CROSS-REFERENCE TO RELATED APPLICATIONS

This application claims priority from German Patent Application No. DE 10 2022 133 039.7, filed on Dec. 12, 2022 in the German Patent and Trademark Office, the disclosure of which is incorporated herein by reference in its entirety.

BACKGROUND

Technical Field

The present invention relates to a method and an apparatus for the free-jet filling of a container with a filling product, for example a beverage, comprising several product components. The apparatus comes into consideration, in particular, as a beverage-tapping system or beverage-dispenser, the apparatus in certain embodiments enabling a re-use of the containers by refilling.

Related Art

Various technologies are known for mixing and filling beverages consisting of several components. In beverage-tapping systems and beverage-dispensers, the components—particularly frequently, carbonated water and syrup or flavours—are mixed in the filling device or in a mixing nozzle. The beverage arising is then usually introduced vertically into the container such as a bottle, cup, etc.

There is increasingly a demand for technical solutions that permit a re-use of containers/bottles by refilling. The idea is that a refilling machine—installed in a shopping centre, for instance—permits the final consumer to refill a beverage bottle with beverages, in particular with carbonated products. On an industrial scale, carbonated beverages are usually filled under pressure—that is to say, pressed against the filling device. For hygienic reasons, this cannot be put into effect in such refilling machines, because, in order to prevent an entrainment of contaminants, germs, etc. from bottle to bottle, the filling product should not be filled under pressure but should be filled using the free-jet principle.

Beverage-dispensers that permit a re-use of containers by refilling are evident from DE 10 2020 124 352 A1 and DE 10 2020 116 266 A1, for instance.

In the case of beverage-tapping systems, beverage-dispensers and similar filling devices that permit the filling of multi-component filling products, the components of the filling product are mixed in the filling device or, at least partly, in the filling jet—that is to say, before the filling product gets into the container. For instance, WO 2013/091750 A1 describes a filling device that, in principle, permits the filling of a multi-component filling product, the components being at least partly mixed in the jet of filling material.

Particularly at high filling speeds, which are definitely desirable for the purpose of increasing productivity, the filling jet may become very turbulent. By virtue of the high filling speed, the syrup as additional component, for instance, has to be added into the carbonated water in metered amounts. If the metering of the syrup into the water jet occurs inline, the product becomes very unsettled, as a result of which a lot of $CO_2$ is lost during the filling process.

The product quality that is customary from industrially filled beverages, particularly as regards $CO_2$ content, is therefore often not obtained in the case of filling by means of beverage-dispensers.

SUMMARY

An improved method and an improved apparatus for the free-jet filling of a container with a filling product, for example a beverage, is described herein according to various embodiments, and comprises several product components. The present disclosure improves the product quality of the filled filling product.

The method and the apparatus serve for the free-jet filling of a container with a multi-component, liquid filling product which is for example a beverage. The method and the apparatus find application, in some embodiments, in a beverage-tapping system or in a beverage-dispenser, for instance for the filling of soft drinks, smoothies, juices, milk products, mixed beverages and the like, the apparatus in one or more embodiments is configured to enable a re-use of the containers by refilling.

The filling product comprises at least two product components, which are also designated herein as "main component" and "additional component", no order, sequence or prioritization being specified by this designation. The main component is in various embodiments carbonated water, and the additional component may be syrup, flavouring, pulp, etc.

The method comprises: holding or fixing the container by means of a container holder; and introducing the several product components into the container by means of a filling device, so that the product components span a free-jet region in one jet in each instance. In this connection, the product components span the free-jet region in separate jets, so that the product components mix only in the container.

In other words, a mixing of the product components in the filling device or in the falling filling jet does not take place. The product jets span the free-jet region simultaneously or at least in temporally overlapping manner—that is to say, a complete temporal separation is not striven for.

Inasmuch as no mixing of the product components occurs in the filling device and/or product jet, the product quality is preserved even at high filling speeds, since a reduction in product quality caused by turbulence is prevented or at least distinctly lessened. In the case of filling products containing $CO_2$, any foaming and an associated loss of $CO_2$ are reduced.

The container has, in conventional manner, a container orifice, a container wall and a container bottom.

The container is held obliquely by the container holder during filling, so that the product components impinge on the container wall after spanning the free-jet region but do not directly impinge on the container bottom. The above effects can be optimized further by such an inclined position of the container, since the free-jet region is shortened and therefore the linear momentum of the product jets is reduced when they impinge on the inner wall of the container. The container in several embodiments has a cylindrical shape, by virtue of which a container axis is defined. A strictly circular cylindrical shape is not required. During filling, the container axis and the jets of the product components in certain embodiments form an angle different from zero, for example within the range from 10° to 45°. Inasmuch as the product jets impinge on the container wall at an angle, the linear momentum of the product jets can be reduced further, as a result of which any reduction in product quality caused by turbulence or linear momentum is lessened further.

After the impinging on the container wall, the product components in various embodiments run as a film along the container wall in the direction of the container bottom, as a result of which a further calming of the filling process takes place. Ideally, the film wets only a segment of the periphery of the bottle, for example less than 270°.

The product components in one or more embodiments include carbonated water as main component. The additional component may be, for instance, syrup, flavouring, pulp or the like. In this case, the jet of main product ordinarily has a higher volumetric flow-rate than the jet(s) of additional product.

By virtue of the splitting of the product components into separate jets (in the case of syrup/flavouring, the splitting into two or more jets is particularly expedient) and the calmed merging by virtue of the inclined container, a slow and gentle intermixing of the components occurs. In the case of a splitting of the product components into several jets, larger boundary surfaces arise, as a result of which the intermixing of the components is distinctly improved.

After spanning the free-jet region, one product component, in particular the additional component, in some embodiments impinges on the film of the underlying product component, in particular of the main component, as a result of which the main component can act as a cushion for the additional component for further calming of the filling process. This is expedient, in particular, when the jet of main product has a higher volumetric flow-rate than the jet(s) of additional product.

This is further achieved by virtue of an apparatus for the free-jet filling of a container with a filling product, for example a beverage, comprising several product components. The apparatus has: a container holder for holding the container during filling; and a filling device which has an orifice section with several product outlets and is configured to introduce the product components into the container through the corresponding product outlets in such a way that the product components span a free-jet region in one jet in each instance. The filling device, in particular the orifice section thereof, is configured in such a way that the product components span the free-jet region in separate jets, so that the product components mix only in the container. Furthermore, the container has a container wall and a container bottom, the container holder is configured to hold the container obliquely during filling, so that the product components impinge on the container wall after spanning the free-jet region.

The features, technical effects, advantages and embodiments that were described with respect to the method apply analogously to the apparatus.

The product outlets are in several embodiments spaced from one another, in particular with a spacing of more than 5 mm, for example within the range from 5 mm to 10 mm. By virtue of the splitting, arrangement and orientation of the product outlets, and therefore of the various product jets, the intermixing of the product components in the container can be brought about sufficiently, even if there are relatively large differences in density and viscosity between the product components.

The container holder is in certain embodiments configured to hold the container at an angle within the range from 10° to 45° relative to the direction of gravity.

For the aforementioned reasons, the orifice section and the container holder are configured in some embodiments in such a way that after impinging on the container wall the product components run as a film along the container wall in the direction of the container bottom, the film in various embodiments wetting only a segment of the periphery of the bottle, for example less than 270°.

For the aforementioned reasons, the orifice section and the container holder are configured in such a way that after spanning the free-jet region one product component, in particular the additional component, impinges on the film of the underlying product component, in particular of the main component.

Further advantages and features of the present invention are evident from the following description of exemplary embodiments. The features described therein may be put into effect on their own or in combination with one or more of the features set forth above, to the extent that the features do not contradict one another. The following description of exemplary embodiments is given with reference to the accompanying drawings.

BRIEF DESCRIPTION OF THE FIGURES

Exemplary further practical forms of the invention will be elucidated in more detail by the following description of the Figures.

DETAILED DESCRIPTION

In the following, exemplary embodiments will be described with reference to the Figures. Like, similar or like-acting elements in the Figures have been provided with identical reference symbols, and a repeated description of these elements will be dispensed with in some cases, in order to avoid redundancy.

Figure 1:
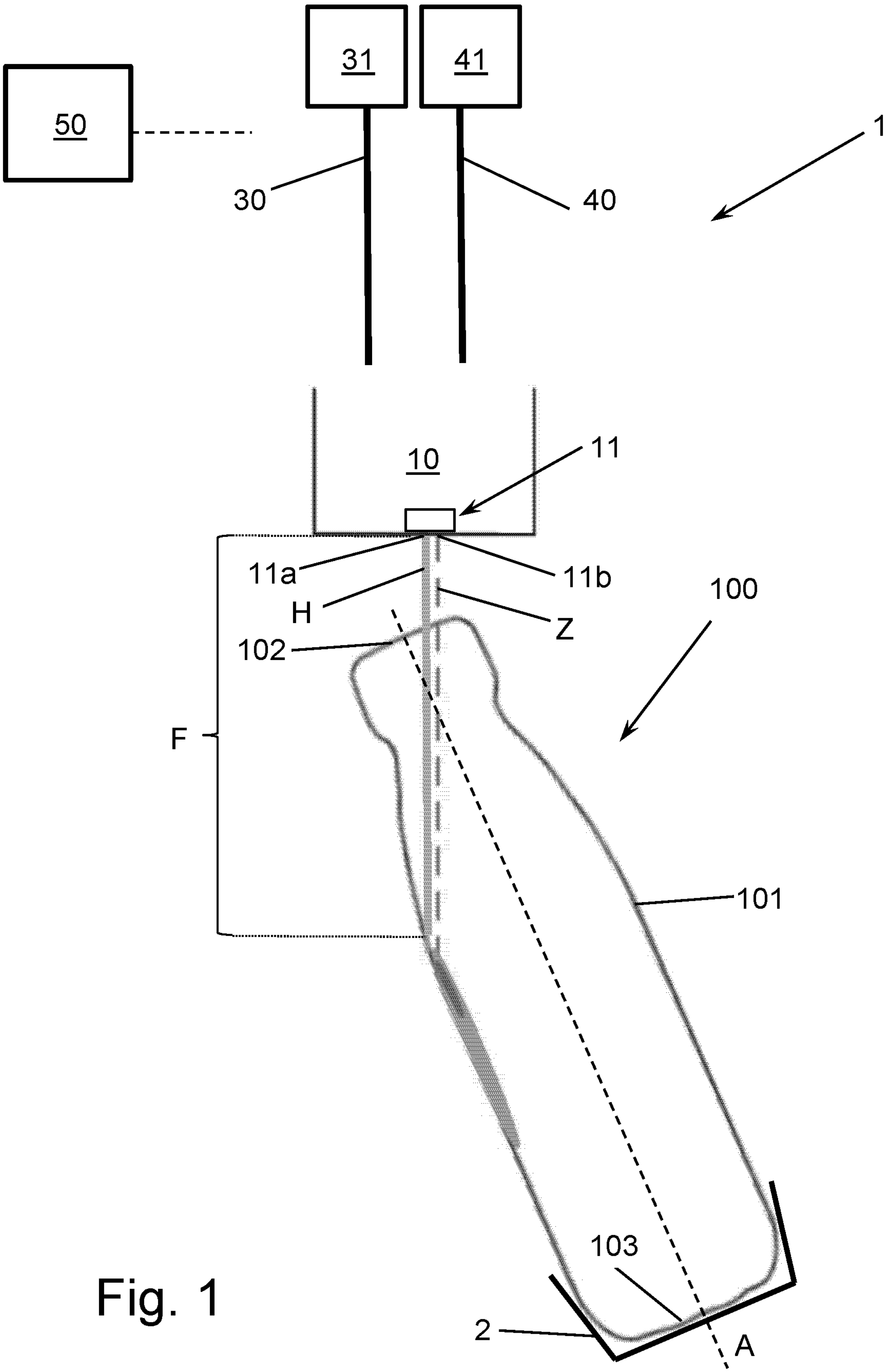
FIG. 1 shows a schematic view of an apparatus for the free-jet filling of containers with a multi-component filling product.

FIG. 1 is a schematic view of an apparatus 1 for the free-jet filling of containers 100 with a multi-component filling product, in particular a multi-component beverage.

The apparatus 1 has particularly been realized as a beverage-tapping system or beverage-dispenser, including, in particular, a filling device that permits a re-use of the containers 100 by refilling. In this case, the containers 100 to be filled are ordinarily supplied manually by a user and are removed after filling. Beverage-dispensers of such a type are installed, for instance, in shopping centres, universities, railway stations, airports and the like.

The container 100 has a container wall 101 of in one embodiment cylindrical shape, a container orifice 102 and also a container bottom 103. In the case of a cylindrical shape, the container 100 defines a container axis A. The container 100 is in some embodiments a bottle, for instance made of glass or plastic. The container 100 has in certain embodiments been designed for multiple use.

The apparatus 1 includes a filling device 10 which has been configured as a free-jet valve—that is to say, the filling product is introduced into the container 100 in unpressurized manner, whereby after leaving the filling device 10 the filling jet spans a free-jet region F and gets into the container 100 substantially without external influence exerted by the container orifice 102. In particular, the container is not pressed against the filling device in the course of free-jet filling and in multiple embodiments does not come into contact with said device.

The containers 100 are held in the apparatus 1 for and during the filling by a suitable container holder 2—which may have been realized, for instance, as a clamp, a magnetic holder or in some other way—below the filling device 10, or below the orifice section 11 thereof.

Soft drinks, smoothies, juices, milk products, mixed beverages and the like enter into consideration as filling products to be filled. The apparatus 1 is particularly suitable for the filling of carbonated beverages in a free jet.

The filling product comprises at least two product components which are also designated herein as "main component H" and "additional component Z". The main component H is for example carbonated water; the additional component Z may be syrup, for instance. However, there is no restriction in this regard. For instance, the main and additional components H, Z may be milk with differing fat contents, in order in this way to be able to adjust a desired fat content in the filled product flexibly. Alternatively, juices with bits of fruit can be filled, whereby pulp as additional component Z is admixed to a juice main component H. The additional component Z may comprise additives, flavouring substances etc. Furthermore, applications outside the beverage industry or food industry are possible, for instance in the care sector for the filling of shampoo and the like.

The filling device 10 is suitable for a fast, flexible change of product-type, particularly when the various filling products are based on a common carrier medium—the main component H—and various additives—the additional components Z.

In an upper section of the filling device 10, a first product supply line 30 and a second product supply line 40 have been provided, both represented schematically in FIG. 1, in order to introduce the main component H and the additional component Z into corresponding ducts of the filling device 10. The product supply lines 30, 40 draw the product components appropriately from, for instance, a reservoir 31 of the main component H, from a reservoir 41 of the additional component Z, from a production facility, from a product port, or in another suitable way.

The filling device 10 includes an orifice section 11 with several product outlets, comprising one or more main outlets 11*a* and one or more additional outlets 11*b*, which is configured to introduce the main component H and the additional component Z into the container 100 appropriately.

Figure 2A:
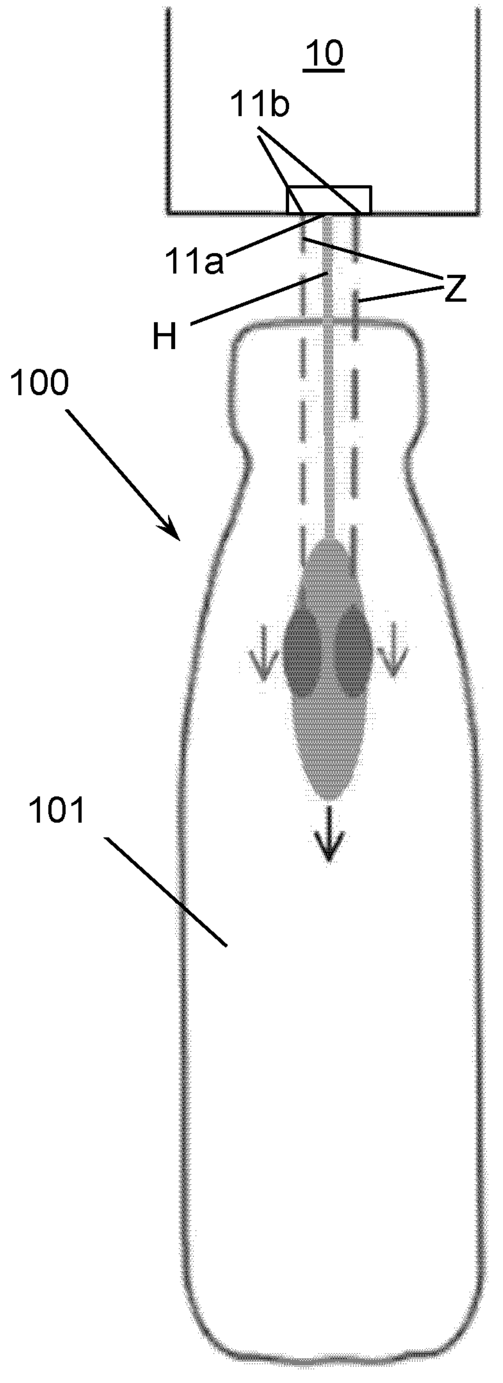
FIG. 2*a* shows schematically a distribution/propagation of the product film in the container at a first instant of filling.
Figure 2B:
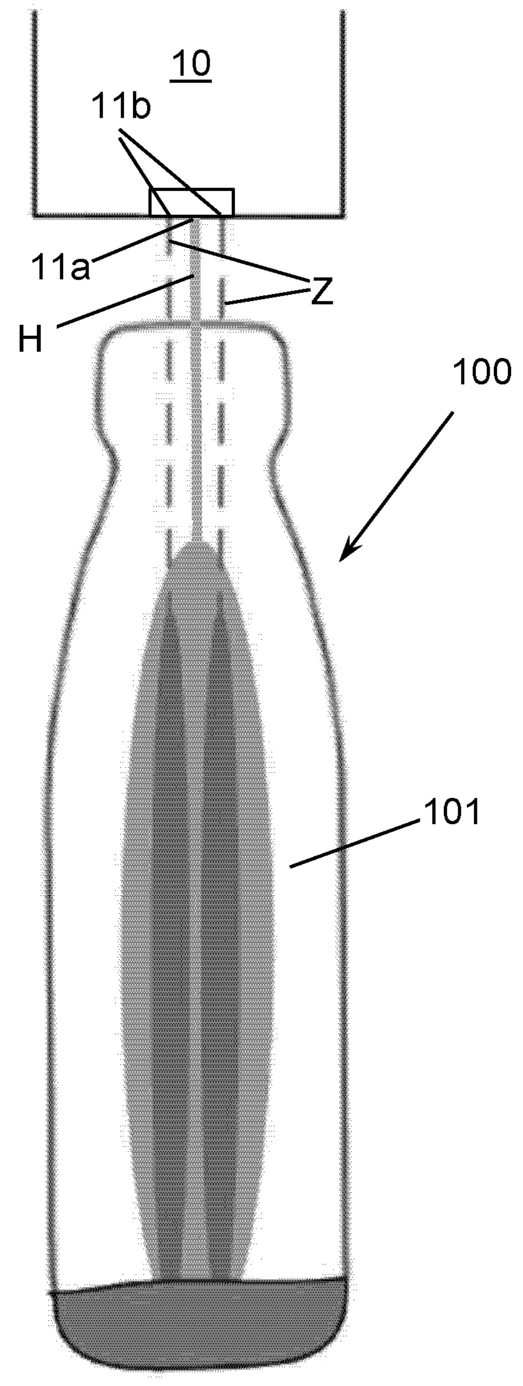
FIG. 2*b* shows schematically a distribution/propagation of the product film in the container at a later, second instant of filling.

In particular for the additional component Z, several outlets—that is to say, several additional outlets 11*b*—have in various embodiments been provided, similar to a shower head; cf. FIGS. 2*a* and 2*b*, in which two additional outlets 11*b* are shown by way of example. The diameter of the main outlet 11*a* amounts to 5 mm to 6 mm, for instance, whereas the diameter of the additional outlets 11*b* amounts to 2 mm, for instance.

For the purpose of activating the filling device 10, a control unit 50 has been provided which is in communication with appropriate valves for opening/closing the main and additional outlets 11*a*, 11*b* and also with any sensors for monitoring the filling process, and is configured to control or regulate the filling process. The communication may be hard-wired or wireless, digital or analogue. The communication does not necessarily have to encompass an exchange of information in both directions. A unidirectional flow of data and/or signals is covered herein by the term "communication". The control unit 50 does not unconditionally have to be constituted by a central computing device or electronic control system; rather, decentralized and/or multi-stage systems, control networks, cloud systems and the like are encompassed. The control unit 50 may, in addition, be an integral part of a higher-level plant control system, or may communicate with such a system.

The orifice section 11 of the filling device 10, comprising the main and additional outlets 11*a*, 11*b*, is configured in such a way that the main component H and the additional component Z do not mix either in the filling device 10 or in the free-jet region F. Rather, the main and additional components H, Z span the free-jet region F in separate jets, so that the various components of the filling product mix only in the container 100, in particular along the container wall 101. A mixing in the filling device 10 or in the falling filling jet does not take place.

For this purpose, the main and additional outlets 11*a*, 11*b* are spaced from one another and oriented in such a way that the product jets span the free-jet region F separately—that is to say, they run in parallel or move away from one another. The spacing of the various product outlets—in particular, of the main and additional outlets 11*a*, 11*b*—in some embodiments amounts to more than 5 mm; for instance, it lies within the range from 5 mm to 10 mm.

An injection of the additional component Z into the main component H, or vice versa, does not take place. Equally, the main component H and the additional component Z do not leave the orifice section 11 via a common outlet. The product jets H, Z span the free-jet region F simultaneously or at least in temporally overlapping manner—that is to say, a complete temporal separation is not striven for.

Inasmuch as no mixing of the main component H and the additional component Z occurs in the filling device 10 and/or product jet, the product quality is preserved even at high filling speeds, since a reduction in product quality caused by turbulence is prevented or at least distinctly lessened. In the case of filling products containing $CO_2$, any foaming and an associated loss of $CO_2$ are reduced. By virtue of the splitting, arrangement and orientation of the main and additional outlets 11*a*, 11*b*, and therefore of the various product jets, the intermixing of the components in the container 100 can be brought about sufficiently, even if there are relatively large differences in density and viscosity.

The above effects can be optimized further, by the product components being introduced into a container 100 positioned obliquely, so that the main and additional components H, Z do not impinge on the container bottom 103 but rather on the inclined container wall 101. For this purpose, the container holder 2 is configured to incline the container 100—that is to say, the container axis A deviates from the vertical or the direction of gravity. The container axis A and the jets of the main and additional components H, Z form an angle, in one or more embodiments within the range from 10° to 45°.

In this process, the product jets H, Z impinge on the container wall 101 and run together as a film along the container wall 101 in the direction of the container bottom 103. This is shown in FIGS. 2*a* and 2*b*, which represent schematically the distribution and propagation of the product film at a first instant of filling (FIG. 2*a*) and at a later, second instant of filling (FIG. 2*b*). FIGS. 2*a*, 2*b* show the container 100 from the side, relative to the representation shown in FIG. 1. Ideally, the film wets only a segment of the periphery of the bottle, for example <270°. The additional component Z in various embodiments impinges on the film of the underlying main component H, so that the main component H can act as a cushion for the additional component Z for further calming of the filling process.

By virtue of the splitting of the components into separate jets (in the case of syrup/flavour, the splitting into two or more jets is particularly expedient) and the calmed merging by virtue of the inclined container 100, a slow and gentle intermixing of the components occurs. In the case of a splitting of the components into several jets (for instance, syrup and water), larger boundary surfaces arise, as a result of which the intermixing of the components is distinctly improved.

By virtue of the inclined position of the container 100, the linear momentum of the jets can be kept slight by virtue of the comparatively short exit path—that is to say, a small free-jet region For a small height of fall from the filling device 10 until the impingement on the container wall 101, contributing to a further improvement in the quality of the final product. In the case of filling products containing $CO_2$, any foaming and an associated loss of $CO_2$ can be minimized, substantially due to the slow intermixing of the flowing films on the surface of the container wall 101.

Depending upon the properties of the product components (differences in density, differences in viscosity, etc.), two or more jets having optimized arrangement are utilized, in order to obtain a good intermixing.

To the extent that they are applicable, all the individual features that have been presented in the embodiments may be combined with one another and/or exchanged without departing from the scope of the invention.

What is claimed is:

1. A method for free-jet filling of a container with a filling product, comprising:

holding the container obliquely by a container holder, wherein the container comprises a container wall and a container bottom; and introducing a plurality of product components of the filling product into the container via a filling device so that the plurality of product components crosses a free-jet region at least in a temporally overlapping manner, wherein:

each product component crosses the free-jet region in a separate product jet so that a mixing of the product components in the filling device or in a falling product jet does not take place, and the plurality of product components mix only in the container and impinge on the container wall after crossing the free-jet region, after impinging on the container wall, the plurality of product components run as a film along the container wall in a direction of the container bottom and the film wets a segment of a periphery of the container, and the plurality of product components comprises a main component and an additional component, and the main component comprises carbonated water.

2. The method of claim 1, wherein:

the container comprises a cylindrical shape and defines a container axis, and the container axis and the product jets of the plurality of product components form an angle that is not zero.

3. The method of claim 2, wherein the angle is between 10° to 45°.

4. The method of claim 1, wherein the film wets less than 270° of the periphery of the container.

5. The method of claim 1, wherein after crossing the free-jet region, the additional component impinges on the film of the main component.

6. The method of claim 1, wherein each product component crosses the free-jet region in a separate product jet so that a mixing of the product components in the filling device and in a falling product jet does not take place, and the plurality of product components mix only in the container and impinge on the container wall after crossing the free-jet region.

7. An apparatus for free-jet filling of a container with a filling product, comprising:

a container holder configured to hold the container during filling, wherein the container comprises a container wall and a container bottom; and a filling device having an orifice section comprising a plurality of product outlets, the filling device configured to introduce a plurality of product components of the filling product into the container so that the plurality of product components crosses a free-jet region at least in a temporally overlapping manner, wherein:

the plurality of product components comprises a main component and an additional component, and the main component comprises carbonated water, the orifice section is configured so that each product component crosses the free-jet region in a separate product jet so that a mixing of the product components in the filling device or in a falling product jet does not take place, and the plurality of product components mix only in the container, the container holder is configured to hold the container obliquely during filling so that the plurality of product components impinge on the container wall after crossing the free-jet region, and the orifice section and the container holder are configured so that the plurality of product components, after impinging on the container wall, runs as a film along the container wall in a direction of the container bottom, and the film wets a segment of a periphery of the container.

8. The apparatus of claim 7, wherein the plurality of product outlets are spaced from one another at a distance of more than 5 mm.

9. The apparatus of claim 7, wherein the plurality of product outlets are spaced from one another at a distance of 5 mm to 10 mm.

10. The apparatus of claim 7, wherein the container holder is configured to hold the container at an angle of 10° to 45° relative to gravity.

11. The apparatus of claim 7, wherein the film wets less than 270° of the periphery of the container.

12. The apparatus of claim 7, wherein the orifice section and the container holder are each further configured so that the additional component, after crossing the free-jet region, impinges on the film of the main component.

13. The apparatus of claim 7, wherein the filling product comprises a beverage.

14. The apparatus of claim 7, wherein the container is designed for multiple use.

15. The apparatus of claim 7, wherein the orifice section is configured so that each product component crosses the free-jet region in a separate product jet so that a mixing of the product components in the filling device and in a falling product jet does not take place, and the plurality of product components mix only in the container.

* * * * *